US007034659B2

(12) United States Patent
Ungs

(10) Patent No.: US 7,034,659 B2
(45) Date of Patent: Apr. 25, 2006

(54) METHOD AND SYSTEM FOR LIMITING USE OF ELECTRONIC EQUIPMENT

(75) Inventor: Kelly J. Ungs, Marion, IA (US)

(73) Assignee: Intermec IP Corp., Everett, WA (US)

(*) Notice: Subject to any disclaimer, the term of this patent is extended or adjusted under 35 U.S.C. 154(b) by 394 days.

(21) Appl. No.: 10/320,157

(22) Filed: Dec. 16, 2002

(65) Prior Publication Data

US 2004/0056759 A1 Mar. 25, 2004

Related U.S. Application Data

(60) Provisional application No. 60/319,567, filed on Sep. 23, 2002.

(51) Int. Cl.
*H04Q 1/00* (2006.01)

(52) U.S. Cl. ................................ 340/5.74; 340/539.23

(58) Field of Classification Search ............... 340/5.74, 340/5.61, 10.1, 10.5, 539.1, 572.1, 539.11, 340/539.23, 573.1; 713/200; 235/380
See application file for complete search history.

(56) References Cited

U.S. PATENT DOCUMENTS 4,791,409 A * 12/1988 Reid ..................... 340/539.23
4,987,406 A * 1/1991 Reid ..................... 340/539.11
5,315,290 A * 5/1994 Moreno et al. .......... 340/539.1
5,530,431 A * 6/1996 Wingard .................. 340/539.1
5,870,029 A * 2/1999 Otto et al. ............... 340/573.1
5,874,902 A * 2/1999 Heinrich et al. ........... 340/10.5
5,949,335 A * 9/1999 Maynard ................. 340/572.1
5,959,275 A * 9/1999 Hughes et al. .............. 235/380
5,963,134 A * 10/1999 Bowers et al. ........... 340/572.1

OTHER PUBLICATIONS

Ericsson Press Releases, "Ericsson announces the R290 satellite phone", Jun. 22, 1999.

* cited by examiner

*Primary Examiner*—Brian Zimmerman
(74) *Attorney, Agent, or Firm*—Simmons, Perrine, Albright & Ellwood, PLC

(57) ABSTRACT

A system and method for securing electronic devices with a non-physical tether which automatically disables operation of the device when the device fails to confirm its location within a predetermined area and/or connection to a predetermined network.

6 Claims, 3 Drawing Sheets

METHOD AND SYSTEM FOR LIMITING USE OF ELECTRONIC EQUIPMENT

This application claims the benefit of Provisional Application No. 60/319,567, filed Sep. 23, 2002.

FIELD OF THE INVENTION

The present invention relates to electronic equipment, and more specifically relates to methods and systems for monitoring the location of and limiting the use of protected object, and even more specifically relates to systems and methods which determine a status of a protected object as being within a predetermined space of intended location or operation and limiting uses of such protected object based upon such status and otherwise affecting identification and/or security of such protected object.

BACKGROUND OF THE INVENTION

In the past, owners of electronic equipment have encountered losses of use of their electronic equipment when such equipment is misappropriated from its space of intended operation. Theft is an obvious example of such a misappropriation. Other examples exist as well. Employees of a company may take electronic equipment home or elsewhere and use them in unauthorized ways. These misappropriations can provide the misappropriator with considerable benefits, at least from their point of view.

Numerous measures are routinely taken to reduce such misappropriations. For example, building security and physical locks and mounts, etc. help to prevent outsiders from removing equipment from its space of intended operation. However, if the equipment is being misappropriated by an employee, then it becomes more difficult to thwart. The problems of securing mobile equipment become even more difficult. Often, measures to limit misappropriation reduce the ability to fully utilize the equipment. This creation of inefficiencies of use upon the proper users of the equipment can be burdensome and is undesirable.

Similar concerns exist with non-electronic equipment.

Consequently, there exists a need for improved systems and methods for securing, identifying and reducing misappropriation of protected objects and electronic equipment without the concomitant increases in inefficiencies of use which are often placed upon the proper users of the equipment when typical security measures are employed.

SUMMARY OF THE INVENTION

It is an object of the present invention to provide a system and method for securing electronic appliances in an efficient manner.

It is a feature of the present invention to utilize an automatic device operation disabling system.

It is another feature of the present invention to include software in the secured device which periodically confirms a geographic location of the device within predetermined limits.

It is yet another feature of the invention to include a system to confirm connection to a predetermined network to enable continued operation of the secured device.

It is an advantage of the present invention to achieve improved security for electronic equipment while reducing inefficiencies resulting from security measures.

The present invention is an apparatus and method for securing electronic equipment which is designed to satisfy the aforementioned needs, provide the previously stated objects, include the above-listed features, and achieve the already articulated advantages. The present invention is carried out in a "theft benefit elimination system" in a sense that the ordinary benefit a thief seeks when removing electronic equipment from its proper place has been greatly reduced.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
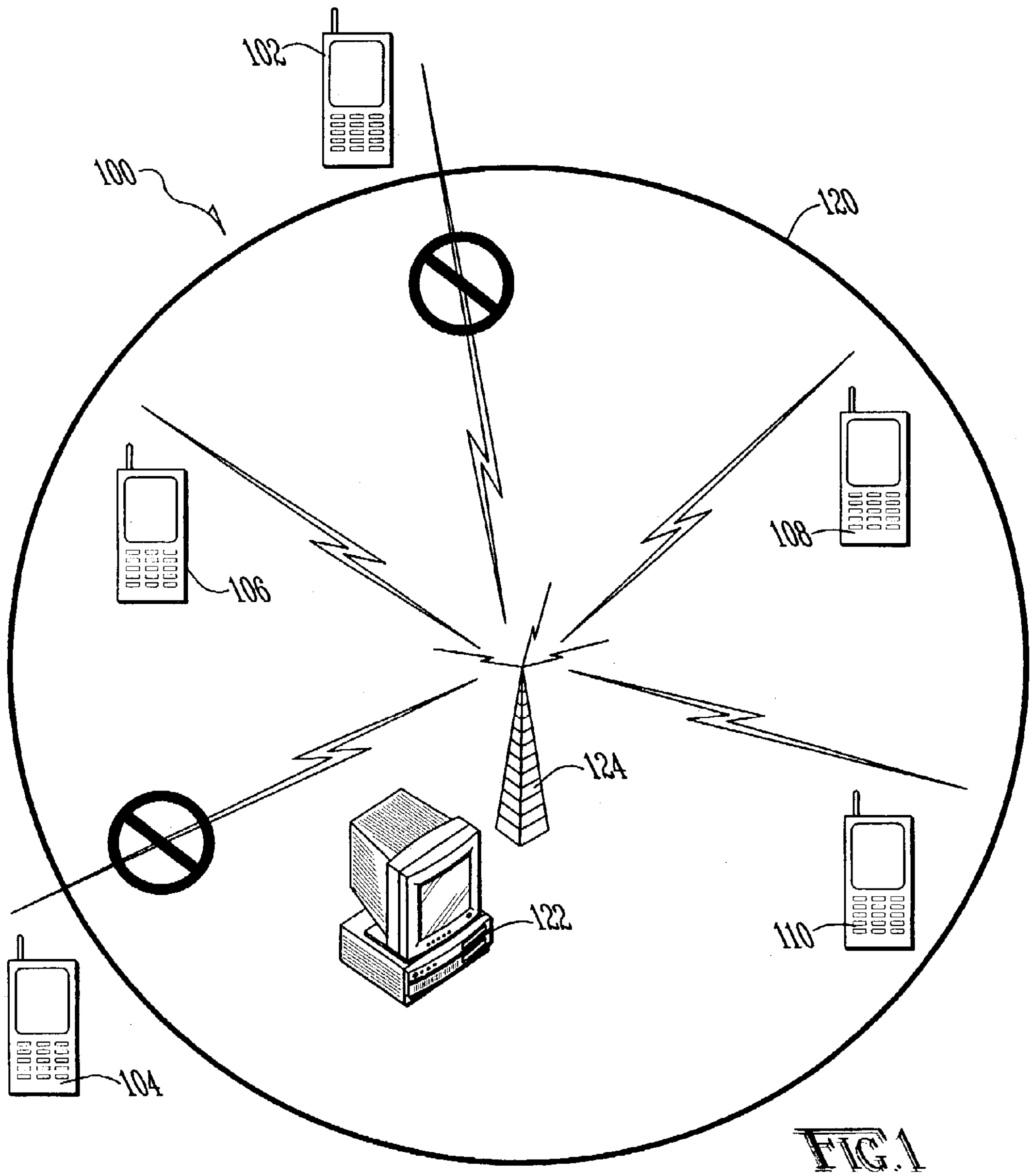
FIG. 1 is a simplified view of a system of the present invention, where the shaded circle represents a predetermined area in which an electronic device is configured to operate.

Now referring to the drawings wherein like numerals refer to like matter throughout, and more specifically referring to FIG. 1, there is shown a system of the present invention generally designated 100, including numerous electronic devices 102, 104,106, 108 and 110. These electronic devices are depicted as handheld wireless terminals. However, the present invention is intended to include any type of electronic device, such as, but not limited to, the following: desktop personal computers, mobile computing devices, laptop computers, bar code scanners and other types of scanners, printers, infrastructure equipment, network access points, routers, radio frequency (RF) or other identification tag decoding machines, network managers and controllers. While the above list of equipment includes only electronic equipment which typically are coupled to and use computer networks, the present invention is intended to include even more electronic devices, such as security, navigation, or control equipment for motor vehicles, or any type of electronic device for which it is desirable to have restricted general use when the device is removed from its intended area or when it is not used as intended.

Electronic devices 102 and 104 are shown disposed outside of a predetermined space of intended operation 120. Predetermined space of intended operation 120 may be a physical space such as a manufacturing plant, office complex, etc. with defined geographic limits. It may also be a space defined by connection to a network. For example, predetermined space of intended operation 120 may be defined to be a space without geographic limits which is a subset of electronic devices which are properly connected (via wires, wireless, or the internet or otherwise) to a network.

Predetermined space of intended operation 120 is defined by some infrastructure which may be used to determine the presence of the electronic devices within the space. Network controller 124 is shown as a transmitter tower which broadcasts a signal to and from electronic devices 106, 108 and 110. Electronic devices 102 and 104 are shown beyond predetermined space of intended operation 120 and, therefore, are not connected to network controller 124. The method of connection between an electronic device and network controller 124 can be wired or wireless (terrestrial or satellite). Network controller 124 may be coupled to a security host computer 122 or other equipment which controls or helps to control security and operability of the electronic devices or the network.

In general, the system 100 is configured to disable operation of the electronic devices 102 and 104 because they are outside the predetermined space of intended operation 120. It is believed that eliminating all functionality or a large portion of the otherwise available functionality of an electronic device when it is removed from the predetermined space of intended operation 120, will dramatically reduce the value of such electronic devices to thieves. While the discussion herein is focused around preventing theft and thereby setting the predetermined space of intended operation 120 to be, for example, an office complex, etc., the predetermined space of intended operation 120 may be set to a subset of the electronic device owner's property. Setting the predetermined space of intended operation 120 in such a way could help to reduce the "midnight requisitions" which occur in large companies where employees may misappropriate the resources of employees in other departments or divisions, etc.

In general, the electronic devices would preferably include therein in ROM or RAM, configurable software and/or hardware which will run in the foreground or background and reduce the functionality of the electronic device beyond the normal reduction of functionality which is associated with its location and/or isolation from the network. The software in the electronic devices preferably could be programmed to automatically self disable when it fails to confirm, for a predetermined set variable time interval, its location within an area or its connection to a network. The time interval is variable so as to accommodate mobile users who may only have intermittent connections to the network. If the electronic device is hard-wired to the network via networking cables, etc. and is intended to be generally not portable, then the variable time limit could be set much smaller than would be appropriate for a mobile user. The most robust security would be available to those electronic devices which have the most real time connections to the network.

Alternately, the electronic device could automatically self disable when it determines or calculates that it is outside of the predetermined space of intended operation 120 or is connected to a different and non-approved network. For example, if the electronic device is a mobile wireless device, it could automatically disable itself when it loses contact with a tower, a network, a transmitter, etc. It could also automatically disable itself when it determines that the signal strength of a terrestrially broadcast signal has dropped below a predetermined signal strength threshold. This predetermined threshold could be set to generally represent a geographic area around the source of the terrestrially broadcast signal. Formulas, such as the well-known Longley-Rice signal strength calculators, could be employed to determine a threshold signal strength which could correspond to a desired geographic area. The network controller 124 may be the same infrastructure that is used for normal operational communication between the electronic device and the-remainder of the network, or it could be a system or transmitter, etc. used only for security and which is independent of the normal operation of the electronic device.

The terms "disable operation" or "automatically self-disable" and similar terms used herein to describe the change in state of operation of an electronic device in response to a determination of location and or network connection status, are intended to include many different types of actions relating to changing the operational capabilities of the electronic device. For example, the change in operational capabilities may be that an error message is displayed and a password is required to be entered or a proper network connection be made before normal operations are resumed. The device may be rendered unable to start up. The device may be operational, but with limitations being placed upon operation which would be additional to and not otherwise associated with the location of the device and/or the lack of connection to a network.

For example, an electronic device which is a general purpose laptop computer and is secured by the present invention, might require a different password to be entered when the laptop is started after it has been determined to be outside the predetermined space: of intended operation 120.

Another example could be where an ignition or other control system in a motor vehicle or vessel is the secured electronic device. Various technologies, alone or in combination, such as global positioning systems (GPS) and General Packet Radio Service (GPRS) and others could be employed to determine if a vehicle is removed from the predetermined space of intended operation 120. If the vehicle is removed from the predetermined space of intended operation 120, an audible warning or the like might be issued, giving the operator a specified time before which the vehicle is shut down or its maximum speed is severely limited. In the example of a control system of a motor vehicle or other electronic device which may not have a display, the operation of the electronic device to normal operation may require return to the predetermined space of intended operation 120, or intervention by a network administrator or specialized technician.

Another example of restricting the use of electronic equipment to work in a predetermined space of intended operation 120, would be for military equipment. For example, shoulder fired anti-aircraft surface to air missiles, such as the stinger missile, could be equipped with the present invention. If the missile is not being used in the predetermined theater of operations, i.e. the predetermined space of intended operation 120, the device could be disabled. This could be used to provide assurances that weapons deployed in a foreign theater do not make their way back to the U.S. for use against civilian aircraft. The equipment could also be configured to require a check-in with a host computer via satellite or other network, etc. to receive an approval prior to use even if within its space of intended operations. Numerous other examples of uses are possible, such as, but not limited to, handheld electronics, (communication equipment, navigation equipment, etc.) artillery, rifles, explosives etc. The precise configuration of the present invention would be adapted for each particular use, but methodologies such as described herein for other equipment may be readily used for military equipment as well.

Figure 2:
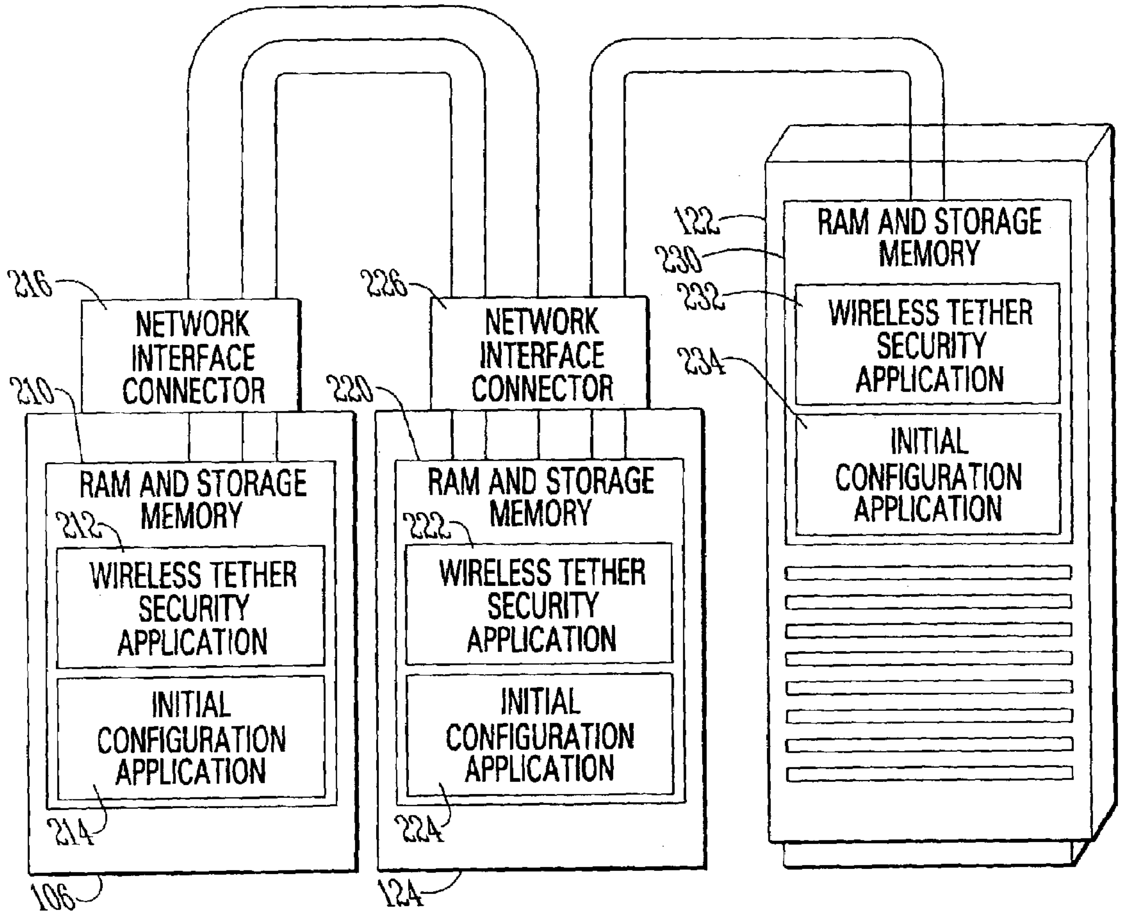
FIG. 2 is a block diagram view of a network connection controlled device of the present invention.

A more detailed understanding of a particular embodiment of the present invention can be achieved by now referring to FIG. 2, which generally shows a secured electronic device 106, network controller 124, a security host computer 122 and the connections and interfaces therebetween. More specifically, electronic device 106 is shown having an electronic device RAM and data storage 210 which is well known in the prior art. Electronic device RAM and data storage 210 includes therein electronic device non-physical tether security application 212, which is the software on the electronic device which runs after initial configuration is established, and which performs the function of determining when and if the electronic device 106 should self-disable operational characteristics of the electronic device which otherwise would be available. Preferably, this software would initiate a check, at predetermined time intervals, across the network to detect the network controller 124. The electronic device non-physical tether security application 212 will wait for a response from the network controller 124. If no response is received, electronic device non-physical tether security application 212 will automatically put the electronic device in a non-operational state or a state which has diminished operational characteristic than would otherwise occur from the location of the electronic device and/or the lack of communication of the device with the network controller 124.

Electronic device non-physical tether security application 212 has various user selectable parameters which are configured upon initialization by electronic device initial configuration application 214. Electronic device non-physical tether security application 212 can be a wired tether or a wireless tether and can be viewed as an electronic version of a tether, lock, shackle, etc.

Electronic device 106 is coupled to the network and network controller 124 via secured electronic device to network interface connector 216, which could be various types of network interface connectors, depending upon the type of device of electronic device 106 and the type of network being used.

Network controller 124 is coupled to the network via network manager network interface connector 226. Network controller 124 includes a well-known network controller RAM and data storage 220, which includes network controller non-physical tether security application 222 and network controller initial configuration application 224. Network controller non-physical tether security application 222 is an application which responds to receipt of check messages issued by electronic device non-physical tether security application 212. The responses to a check message may be either a direct response to electronic device 106 or it may first determine from security host computer 122 that a connection exists, and then a response can be sent to electronic device 106. Network controller non-physical tether security application 222 would preferably have numerous user settings which are configured upon initialization of network controller 124 by the network controller initial configuration application 224.

Network controller 124 may be integrated with security host computer 122 or they may be separate devices as shown.

Security host computer 122 includes security host RAM and data storage 230 with security host non-physical tether security application 232 and security host initial configuration application 234 therein. One of the many possible functions of security host computer 122 would be to report to the network controller 124 of the existence of a connection, which would then provide a positive acknowledgment of the check message to the electronic device 106.

In operation, the system shown in FIG. 2 might function as follows:

Step 1. Electronic device non-physical tether security application 212 initiates a check message.

Step 2. Network controller 124 receives the check message and returns a positive acknowledgment of the check message, or network controller 124 passes the request on to security host computer 122.

Step 3. Security host computer 122 verifies the existence of a connection and replies to the network controller 124.

Step 4. Network controller 124 provides a positive acknowledgment to electronic device 106.

Step 5. Electronic device resets a timer to send another check message at a later time.

If the electronic device 106 does not receive a positive acknowledgment from the network controller 124 (solely or with the assistance of security host computer 122), then the electronic device will automatically self-disable operational functionality that would otherwise exist.

Throughout this description, numerous references are made to "automatically disabling functionality" and "self-disabling", etc. It should be understood that these terms are not intended to include operational features or functionality of an electronic device which are reduced for the purpose of limiting power consumption of the electronic device.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

Throughout this description, "bar code scanner" is intended to refer to a wide variety of imaging technology devices irrespective of whether they scan a bar code.

Figure 3:
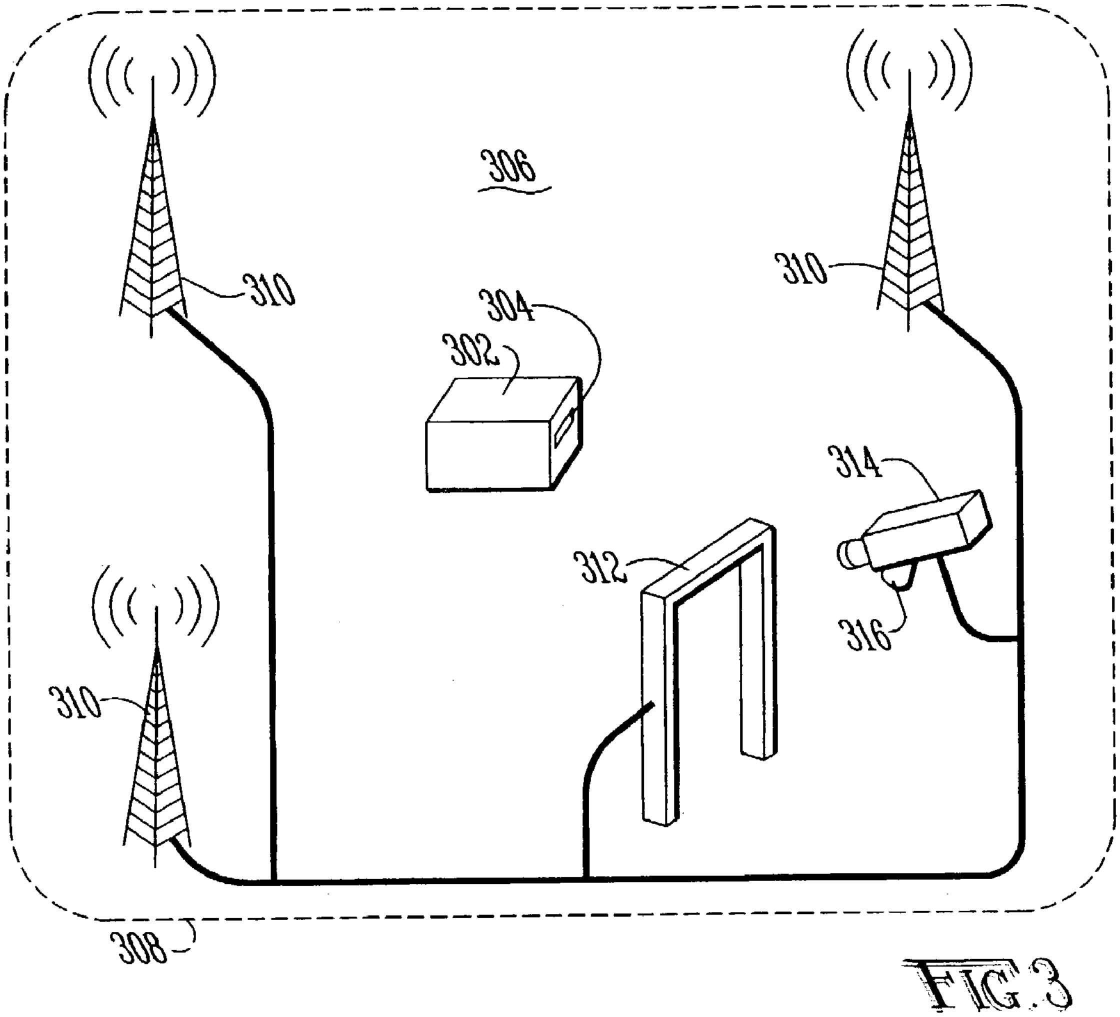
FIG. 3 is a simplified view of a system of the present invention where RF ID tags are tracked, registered, reregistered and monitored while within a protected space.

Now referring to FIG. 3, it should also be understood that the protected item need not be an electronic device. The protected item may be a non-electronic device, such as a financial instrument, (stock, bond, note, etc.) jewels, precious stones and metal or any other valuable item. In such cases, the characteristic or operational characteristic may be a characteristic of identification, ownership, authenticity, etc.

When the protected item or object is a non-electronic device, the system may function as follows:

The protected item 302 would have affixed or otherwise coupled thereto an RF ID tag 304 or similar structure or indicia of ownership, etc. The protected area 306 or area of intended operation could be any area whose perimeter 308 is secured and having RF ID tag interrogators 310 or scanners 312 therein. The system would continuously register and reregister the RF ID tags as they move about within the protected area. The tag 304 may be tagged with information relating to the items' location history. If the item is removed from the protected area 306 or area of intended operations, then security cameras 314, microphones 316, or other surveillance equipment could be activated to record the removal of the protected item. The RF ID tag 304 could be tagged with indicia of its status of being improperly removed from a protected area 306. This updated RF ID tag could be used to thwart unauthorized resale, etc. of the protected item 302.

RF ID tags 304 are well known in the art. Interrogators 310 and scanners 312 are capable of registering and reregistering the location of protected item while within the protected area 306. In a preferred embodiment of the present invention, interrogators 310 and scanners 312 may be of the type which are capable of tagging or augmenting the tags with additional information. This would allow the location history or other identification information of the protected item 302 to travel with the RF ID tag 304. In another embodiment, the RF ID tag 304 could be a special "smart" RF ID tag, which includes a processor, programmable logic device, etc. which is preprogrammed with software to change an identification characteristic or other characteristic of the tag if it fails to receive an interrogation within a predetermined time interval. This predetermined time interval could be variable depending upon the nature and character of the protected item 302. A protected item 302, which is not intended to be removed from the protected area, could have a very short predetermined time interval. For example, if the protected item is a work of art on display in a gallery, the time interval may be set to a matter of minutes or even seconds. If the time interval passes without a re-registration occurring, then alarms could sound, video cameras 314 and microphones 316 could be activated or recorded, etc.

The perimeter 308 of protected space 306 could be defined by the combination of several factors, including the transmission ranges or fields of the various interrogators 310 and the location of scanners 312. The transmission ranges or fields of interrogators 310 can be omni-directional or "sculpted" to a predetermined general shape using directional antennae and other known techniques.

Throughout this description, the terms "software" and "encoded information" are used. It is intended that these terms be given broad interpretations so as to include, but not be limited to, application software, operating system software, processor specific software, firmware, and any type of executable and non-executable encoded information, etc.

I claim:

1. A system for securing electronic equipment comprising:

a first electronic device and a second electronic device, having dissimilar characteristics for a percentage of time coupled to a computer network;

said computer network configured for providing data communication between said first and said second electronic devices;

said first electronic device having a first means for storing data;

said second electronic device having a second means for storing data;

said first means for storing data containing a first configurable encoded information security application configured for automatically self-disabling said first electronic device when said first electronic device is disconnected from said computer network for a first predetermined time period;

said second means for storing data containing a second configurable encoded information security application configured for automatically self-disabling said second electronic device when said second electronic device is disconnected from said computer network for a second predetermined time period;

said first means for storing data further containing a first configuration encoded information application programmed for configuring said first configurable encoded information security application;

said second means for storing data further containing a second configuration encoded information application programmed for configuring said second configurable encoded information security application; and said first configurable encoded information security application and said second configurable encoded information security application being programmed to allow differing configurations for said first electronic device and said second electronic device in response to said dissimilar characteristics for a percentage of time coupled to a computer network.

2. A system of claim 1 wherein said differing configurations comprise differing time periods for said first predetermined time period and said second predetermined time period.

3. A system of claim 2 wherein said first electronic device is a handheld mobile electronic device and said second electronic device is a desktop computer.

4. A system of claim 3 wherein said second predetermined time period has a longer duration than said first predetermined time period.

5. A system of claim 4 wherein said handheld mobile electronic device is a handheld barcode scanner which is configured to communicate data over a computer network.

6. A system for limiting use of a handheld barcode scanner comprising:

a computer network configured to communicate with mobile wireless handheld barcode scanners;

a first mobile wireless handheld barcode scanner which is configured to communicate data over said computer network;

first initial configuration application disposed on said first mobile wireless handheld barcode scanner;

a first wireless tether application, disposed on said first mobile wireless handheld barcode scanner, and configured by said first initial configuration application, wherein said first wireless tether application comprises:

means for determining whether said first mobile wireless handheld barcode scanner is in communication with said computer network;

means for determining a first duration of any lapse of communication between said first mobile wireless handheld barcode scanner and said computer network;

means for comparing said first duration of a lapse of communication to a first predetermined lapse limit; and, means for automatically limiting further use of said first mobile wireless handheld barcode scanner without the input of a first password where said first password is different from an on-network password which permits use of said first mobile wireless handheld when said first predetermined lapse limit has not been exceeded by said first duration of a lapse of communication;

a second mobile wireless handheld barcode scanner which is configured to communicate data over said computer network;

second initial configuration application disposed on said second mobile wireless handheld barcode scanner;

a second wireless tether application, disposed on said second mobile wireless handheld barcode scanner, and configured by said second initial configuration application, wherein said second wireless tether application comprises:

means for determining whether said second mobile wireless handheld barcode scanner is in communication with said computer network;

means for determining a second duration of any lapse of communication between said second mobile wireless handheld barcode scanner and said computer network;

means for comparing said second duration of a lapse of communication to a second predetermined lapse limit;

means for automatically limiting further use of said second mobile wireless handheld barcode scanner without the input of a second password where said second password is different from an on-network password which permits use of said second mobile wireless handheld when said second predetermined lapse limit has not been exceeded by said second duration of a lapse of communication; and said first predetermined lapse limit is set by said first initial configuration application and said second predetermined lapse limit is set by said second initial configuration application with differing lapse limits in response to differing use characteristic between said first mobile wireless handheld barcode scanner and said second mobile wireless handheld barcode scanner.

* * * * *